United States Patent [19]

Sato et al.

[11] 3,928,268

[45] Dec. 23, 1975

[54] METHOD OF TREATING WASTE PLASTICS

[75] Inventors: Tsutomu Sato, Tokyo; Hiroshi Deura, Yachiyo; Kenkichi Oba, Funabashi, all of Japan

[73] Assignee: Lion Fat & Oil Co., Ltd., Tokyo, Japan

[22] Filed: Mar. 4, 1974

[21] Appl. No.: 447,857

[30] Foreign Application Priority Data

Mar. 19, 1973 Japan.............................. 48-032058

[52] U.S. Cl......... 260/23 H; 220/1 R; 260/DIG. 43; 427/421; 427/430
[51] Int. Cl.².......................................... C08K 5/49
[58] Field of Search... 260/DIG. 43, 94.9 GC, 23 H; 220/1 R; 117/94, 138.8 E, 160 R, 161 R

[56] References Cited
UNITED STATES PATENTS

| | | | |
|---|---|---|---|
| 3,639,321 | 2/1972 | Fuhr et al. ..................... | 204/159.14 |
| 3,676,401 | 7/1972 | Henry ................................... | 260/63 |
| 3,729,404 | 4/1973 | Morgan.......................... | 204/159.14 |
| 3,797,690 | 3/1974 | Taylor et al. ......................... | 260/23 |

*Primary Examiner*—Eugene C. Rzucidlo
*Attorney, Agent, or Firm*—Woodhams, Blanchard and Flynn

[57] ABSTRACT

A method of treating waste plastics, which is characterized by the employment of a decomposition accelerator comprising the component A selected from the group consisting of (a) halogenide of a metal selected from manganese, iron, cobalt, nickel and copper, (b) acetylacetonate or alkylacetylacetonate of said metal and (c) higher fatty acid salt of said metal and the component B consisting of triester of phosphorous acid as admixed with said component A.

9 Claims, No Drawings

METHOD OF TREATING WASTE PLASTICS

BACKGROUND OF THE INVENTION

1. Field of the Invention

The present invention relates to a method of treating waste plastics for the purpose of accelerating the photodecomposition of waste plastics through their exposure to the sunlight.

2. Description of the Prior Art

As a result of mass consumption of plastics as packing materials and so forth in recent years, the waste articles abandoned after use, which are free from decomposition by microbes and the like, would permanently remain intact and accumulate over a long period of time to disturb the natural ecology. Besides, with an increase of waste plastics contained in the city rubbish, coupled with the enormous quantity of heat arising from incineration thereof, there has been brought about the so-called public nuisances due to wastes, such as infliction of damage on the incinerator and emission of toxic gases.

Under such circumstances, various studies have so far been made with a view to providing an effective means of decomposing waste plastics; for instance, Japanese Patent Publication No. 13707/1970 has proposed the method of accelerating decomposition of polyolefin resin by making said resin contain acetylacetonate of a metal selected from manganese, cobalt, chromium, iron, copper and vanadium, alkylacetonate of said metal or alkylbenzoyl acetate of said metal. However, addition of such a component is still insufficient for the purpose of effecting decomposition of resins at a desired speed.

SUMMARY OF THE INVENTION

The object of the present invention is to provide a method of treating waste plastics, which renders it possible to effect a rapid photodecomposition of thermoplastic resins after use, thereby contributing to answering a question involving public nuisances by putting it in the natural cycle system.

Particularly, the present invention provides a method of accelerating photodecomposition of waste plastics by coating the surfaces of waste plastics with a decomposition accelerator-containing solution prepared by dissolving a decomposition accelerator in a solvent, either by sprinkling or spraying said solution over waste plastics or by dipping waste plastics in said solution.

DETAILED DESCRIPTION OF THE INVENTION

A decomposition accelerator for use in the present invention is characterized in that it comprises the component A selected from the group consisting of (a) a halogenide of a metal selected from manganese, iron, cobalt, nickel and copper, (b) an acetylacetonate or alkylacetylacetonate of said metal and (c) higher fatty acid salt of said metal and the component B consisting of triester of phosphorous acid as admixed with said component A. In other words, the present invention is based on the finding that concurrent application of the component A and component B as above brings on a synergetic effect in decomposition.

In the present invention, the component (b), as one constituent of the component A, is an acetylacetonate or an alkylacetylacetonate of a metal selected from manganese, iron, cobalt, nickel and copper. This alkylacetylacetonate is a compound resulting from bonding of an alkyl group having 1 to 18 carbon atoms onto acetylacetonate. Said higher fatty acid salt as another constituent of the component A is a salt resulting from reaction between a fatty acid having 10 to 20 carbon atoms and a metal selected from manganese, iron, cobalt, nickel and copper. Said triester of phosphorous acid as the component B is a compound having a structure to be expressed by the following general formula:

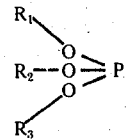

(wherein each of $R_1$, $R_2$ and $R_3$ represents an alkyl group, alkenyl group, allyl group or alkallyl group having 1 to 20 carbon atoms respectively.)

The weight ratio of the component A to the component B is desirable to be in the range of 1:1 to 1:10; when the weight ratio deviates from this range, a satisfactory decomposition effect can not be expected. A decomposition accelerator consisting of the component A and component B admixed at the foregoing ratio is dissolved in an organic solvent selected from an aromatic hydrocarbon, an aliphatic hydrocarbon, a halogenated hydrocarbon, an ether and a ketone, thereby preparing a treating solution. As to the concentration of this treating solution, it is appropriate to mix 1 to 30 parts by weight of the decomposition accelerator per 100 parts by weight of said solvent; the optimum concentration is determined by taking into consideration the solubility of the decomposition accelerator in the solvent, the method of coating and so on. As the method of coating, sprinkling, dipping and spraying are all applicable: the point is to choose an economical and effective method befitting the configurations of the waste plastics concerned. In this connection, in the case of applying the method of coating by spraying, a jetting agent — for instance, hydrocarbons, hydrocarbon fluoride, hydrocarbon chloride, etc. for use in general aerosols and inert gases — may be utilized. Further, for the purpose of facilitating uniform wetting of the surfaces of waste plastics with the decomposition accelerator, a wetting agent may be added.

Plastics to be subjected to treatment in the present invention are thermoplastic resins such as polyolefin-type plastics like high-density polyethylene, low-density polyethylene, polypropylene, etc. or vinyl-type plastics like polyvinyl chloride, polystyrene, etc.

According to the present invention, by merely coating the surface of thermoplastic resins with a treating solution obtained by dissolving a decomposition accelerator comprising the component A consisting of halogenide of a metal selected from manganese, iron, cobalt, nickel and copper or an acetylacetonate or an alkylacetylacetonate of said metal or higher fatty acid salt of said metal and the component B consisting of triester of phosphorous acid is admixed with said component A at a specific ratio in a solvent so as to make the concentration of said decomposition accelerator apposite to the intended mode of use, by either simply sprinkling or spraying said treating solution over waste plastics or dipping waste plastics in said solution, it is possible to accelerate photodecomposition of said plastics and turn the thus photodecomposed thermoplastic resins into resins having low molecular weight.

PREFERRED EMBODIMENTS OF THE INVENTION

EXAMPLE 1.

By subjecting a commercial high-density polyethylene containing a conventional antioxidant and an ultraviolet absorbent added thereto in the process of manufacturing to molding with an extrusion-molding/inflation apparatus, a 0.07 mm-thick sample film was prepared. By dipping this film in a treating solution consisting of ferric chloride, triphenyl phosphite and a solvent at the weight ratio of 1:5:100 for 30 to 40 seconds and then applying ultraviolet rays thereto by means of a high-tension mercury-arc lamp for 100 hours, the decomposition speed of polymer and the melt index value thereof were sought. The results were as shown in the following Table 1.

Table 1

| solvent | decomposition accelerator | $D1715cm^{-1}/D1890cm^{-1}$ | | MI value | |
|---|---|---|---|---|---|
| | | 0hr | 100hrs | 0hr | 100hrs |
| — | — | 0 | 0 | 1.0 | 0.87 |
| carbon tetrachloride | (ferric chloride + triphenyl phosphite) | 0 | 5.1 | 1.0 | 5.1 |
| chloroform | " | 0 | 4.2 | 1.0 | 4.8 |
| acetone | " | 0 | 3.8 | 1.0 | 4.0 |
| isopropanol | " | 0 | 3.5 | 1.0 | 4.0 |

The decomposition speed of polymer was followed by way of infrared absorption. That is, the decomposition speed of the polymer can be figured out on the basis of the ratio of the absorbancy of carbonyl absorption band of $1715cm^{-1}$ to the absorbancy of crystallization region absorption band of $1890cm^{-1}$ which is stationary during the application of ultraviolet rays.

The formation of carbonyl absorption band of $1715cm^{-1}$ is related to the deterioration of physical properties of said film.

The melt index value was calculated in accordance with JIS K6760.

In the case where the film was dipped in the respective solvent not admixed with a decomposition accelerator, there was observed no change at all.

EXAMPLE 2.

By subjecting a commercial high-density polyethylene, a commercial low-density polyethylene and a commercial polypropylene to molding with an extrusion-molding/inflation apparatus, respectively, a 0.07 mm-thick sample film of each was prepared.

Further, by subjecting a commercial polyvinyl chloride and a commercial polystyrene to molding with a rolling press, respectively, a 0.005 to 0.006 mm-thick sample sheet of each was prepared.

The respective sample film and sheet were dipped in a treating solution consisting of carbon tetrachloride, ferric chloride and trinonylphenyl phosphite at the weight ratio of 100:1:5 for scores of seconds and then ultraviolet rays were applied thereto by means of a high-tension mercury-arc lamp for 100 hours. The result was as shown respectively in the following Table-2.

Table 2

| polymer | time of application of ultraviolet rays (hr) | | |
|---|---|---|---|
| $D1715cm^{-1}/D1890cm^{-1}$ | 0 | 50 | 100 |
| HDPE | 0 | 2.1 | 5.1 |
| LDPE | 0 | 3.5 | 7.0 |
| PP | 0 | 4.4 | 10.2 |
| PVC | | change of color into yellow | (appearance) change of color into yellow; occurrence of cracks |
| PSt | | change of color into yellow | change of color into yellow; occurrence of cracks |

In the case of said commercial polyvinyl chloride and polystyrene, as the following of the decomposition speed by way of infrared absorption is difficult, the change of appearance was shown in this table.

EXAMPLE 3.

By subjecting a commercial low-density polyethylene containing a conventional stabilizer to molding with an extrusion-molding/inflation apparatus, sample films with thickness of 0.02 mm, 0.04 mm, 0.07 mm and 0.10 mm, respectively, were prepared.

Each sample film was dipped in a treating solution consisting of carbon tetrachloride, iron acetylacetonate and tristearyl phosphite at the weight ratio of 100:1:5 for scores of seconds and then ultraviolet rays were applied thereto by means of a high-tension mercury-arc lamp for 100 hours. The result was as shown respectively in the following Table-3.

Table 3

| thickness of film (mm) | $\dfrac{D1715cm^{-1}}{D1890cm^{-1}}$ | time of application of ultraviolet rays (hr) | | | |
|---|---|---|---|---|---|
| | | 0 | 20 | 50 | 100 |
| 0.02 | | 0 | 3.5 | 8.0 | 12.0 |
| 0.04 | | 0 | 2.0 | 4.7 | 9.3 |
| 0.07 | | 0 | 0.9 | 3.2 | 6.4 |
| 0.10 | | 0 | 0.7 | 2.0 | 4.1 |

The photodecomposition speed was followed by way of infrared absorption.

EXAMPLE 4.

An aerosol was prepared by employing a treating solution consisting of isopropanol, carbon tetrachloride, iron acetylacetonate and tristearyl phosphite at the weight ratio of 100:30:1:5 and Freon gas (dichlorodifluoromethane) as the jetting agent. As the container, an aluminum can was employed.

After spraying said aerosol over one side of a film made of a commercial high-density polyethylene, ultraviolet rays were applied thereto by means a high-tension mercury-arc lamp for 100 hours. The result was as shown in the following Table-4.

Table 4

| D1715cm⁻¹/D1890cm⁻¹ | time of application of ultraviolet rays (hr) | | |
|---|---|---|---|
| | 0 | 50 | 100 |
| 0.07mm-thick HDPE film | 0 | 3.1 | 5.5 |

In this connection, the amount of jet was about 15g/10 sec. The result in the case of spraying was similar to that in the case of dipping.

EXAMPLE 5.

An aerosol was prepared by employing a treating solution consisting of isopropanol, carbon tetrachloride, iron acetylacetonate and tristearyl phosphite at the weight ratio of 100:30:2:10 and Freon gas (dichlorodifluoromethane) as the jetting agent.

After spraying said aerosol over a commercial high-density polyethylene and a commercial low-density polyethylene, respectively, by exposing both polyethylenes to the sunlight of the summer season, the photodecomposition speed was measured by way of infrared absorption. The result was as shown respectively in the following Table-5.

Table 5

| D1715cm⁻¹/D1890cm⁻¹ | number of days of exposure | | | | |
|---|---|---|---|---|---|
| | 0 | 10 | 20 | 30 | 50 |
| HDPE | 0 | 1.9 | 4.0 | 6.2 | 10.3 |
| LDPE | 0 | 2.1 | 4.9 | 7.3 | 13.7 |

What is claimed is:

1. A method of treating molded articles made of thermoplastic synthetic resin, wherein said resin is selected from the group consisting of polyolefin resins, polyvinyl chloride and polystyrene, to induce photodecomposition of said resin on exposure to ultraviolet radiation or sunlight, which comprises applying to the surface of said article an organic solvent solution of a composition consisting essentially of
   A. a halogenide of a metal selected from the group consisting of manganese, iron, cobalt, nickel and copper, and
   B. a triester of phosphorous acid of the formula $(RO)_3P$
   wherein each R is a member of the group consisting of alkyl, alkenyl, phenyl or alkylphenyl in the range of 1 to 20 carbon atoms;
   the weight ratio of A:B being in the range of 1:1 to 1:10, said organic solvent solution containing from 1 to 30 parts by weight of said composition per 100 parts by weight of solvent.

2. A method according to claim 1 wherein said article is sprayed with said solution.

3. A method according to claim 1 wherein said article is immersed in said solution.

4. A method according to claim 1 in which A is ferric chloride and B is triphenyl phosphite.

5. A method according to claim 1 in which A is ferric chloride and B is trinonylphenyl phosphite.

6. A method of treating molded articles made of thermoplastic synthetic resin, wherein said resin is selected from the group consisting of polyolefin resins, polyvinyl chloride and polystyrene, to induce photodecomposition of said resin on exposure to ultraviolet radiation or sunlight, which comprises applying to the surface of said article an organic solvent solution of a composition consisting essentially of
   A. an acetylacetonate of a metal selected from the group consisting of manganese, iron, cobalt, nickel and copper, and
   B. a triester of phosphorous acid of the formula $(RO)_3P$
   wherein each R is a member of the group consisting of alkyl, alkenyl, phenyl or alkylphenyl in the range of 1 to 20 carbon atoms;
   the weight ratio of A:B being in the range of 1:1 to 1:10, said organic solvent solution containing from 1 to 30 parts by weight of said composition, per 100 parts by weight of solvent.

7. A method according to claim 6 wherein said article is sprayed with said solution.

8. A method according to claim 6 wherein said article is immersed in said solution.

9. A method according to claim 6 in which A is iron acetylacetonate and B is tristearylphosphite.

* * * * *